United States Patent [19]

Mori

[11] 4,366,507
[45] Dec. 28, 1982

[54] SHADED PICTURE SIGNAL PROCESSING SYSTEM AND METHOD

[75] Inventor: Sumio Mori, Asaka, Japan

[73] Assignee: Fuji Photo Film Co., Ltd., Kanagawa, Japan

[21] Appl. No.: 226,281

[22] Filed: Jan. 19, 1981

[30] Foreign Application Priority Data

Jan. 17, 1980 [JP] Japan .................................. 55-4262

[51] Int. Cl.³ ............................................. H04N 1/40
[52] U.S. Cl. ................................... 358/283; 358/138; 364/515
[58] Field of Search ............... 358/280, 282, 283, 284, 358/138; 364/515

[56] References Cited

U.S. PATENT DOCUMENTS 4,258,393 3/1981 Ejiri ................................... 358/283

*Primary Examiner*—Howard Britton
*Attorney, Agent, or Firm*—Sughrue, Mion, Zinn, Macpeak and Seas

[57] ABSTRACT

A shaded picture signal processing system and method which produces recorded pictures of high quality with a small number of gradation levels with the resolution of the picture maintained nearly unchanged. False contours appearing as quantization distortion are removed by dispersing noise of equal magnitude to the false contours throughout the whole picture or a specified portion of the picture so that the false contours cannot be detected by the human eye.

5 Claims, 15 Drawing Figures

| 10 | 6 | 9 | 5 |
|----|----|----|----|
| 2 | 14 | 1 | 13 |
| 8 | 4 | 11 | 7 |
| 0 | 12 | 3 | 15 |

SHADED PICTURE SIGNAL PROCESSING SYSTEM AND METHOD

BACKGROUND OF THE INVENTION

The present invention relates to a picture signal processing system in which, in reproducing a shaded picture signal, halftones are reproducing with a small number of a gradation levels. More particularly, the invention relates to a signal processing system in which halftones of high quality are reproduced by minimizing the quantization distortion which is caused by expressing shaded picture signals with few gradation levels by forming averages in quantization steps. In general, in order to record a shaded picture on a recording medium or to display it on a display device, it is necessary for the recording medium itself to have a gradation characteristic.

On the other hand, a method is known in the art in which halftones are expressed on a recording medium which is capable of reproducing only two levels (light and shade levels or binary data). With this method, as is well known in the field of printing, halftones are expressed with the number of dots per unitary area. This is termed dot density modulation.

Recently, facsimile systems have been extensively employed. In these systems, it is desirable to transmit not only letters but also pictures with gradations. In order to meet this requirement, various systems have been proposed in which halftones are recorded on a recording medium which can record only binary data. A typical example of such a method is a dither method. The dither method, because it uses a simple algorithm and is easily realizable, is expected to be applied to a variety of technical fields.

The principle of a conventional dither method will be described with reference to FIG. 1. In FIG. 1, reference character $x_{ij}$ designates a picture element having a gradation level of n bits/picture elements at coordinates (i, j) in an input picture and $c_{ij}$ is the threshold of the picture element. The threshold $c_{ij}$ takes random values representative of a threshold pattern in dither. $x_{ij}$ and $c_{ij}$ are compared with a comparator circuit. When $x_{ij} > c_{ij}$, an output picture signal is $y_{ij} = 1$, and when $x_{ij} \leq c_{ij}$, the output picture signal is $y_{ij} = 0$. According to the shading conditions of the input picture, the density of 1's and 0's are varied to express the halftones.

In the case where the gradations of the output picture are expressed with halftones of $2^n$ levels, $c_{ij}$ has $2^n$ thresholds, i.e., takes random values ranging from 0 to $2^n$. In this case, one bit of output is provided for one picture element of the input picture. In general, if $2^n$ dots are outputted as $y_{kl}$ ($k \times l = 2^n$) for n bits/picture-element of an input picture then gradations of $2^n$ layers can be expressed for each picture element of the input picture, i.e., the gradations for one picture element are expressed with $2^n$ dots.

In any one of the various conventional systems, halftones are expressed taking advantage of the characteristics of the human eye, specifically the integration effect of the eye. To acceptably represent a picture element of a picture as number of dots per unit area, 16 dots, for example in $4 \times 4$ arrangement, are required for expressing sixteen gradations, for instance. These dots are averaged by the eye appearing thus as a signal picture element of the proper density. This means that halftones are expressed somewhat at the cost of the resolution of the picture. If, however, the recording medium can be provided with more gradation levels, then the resolution of the picture will be increased as much.

In general, if gradation levels corresponding to six bits, i.e. 64 gradation levels are available, the halftones of a picture can be expressed satisfactorily taking into account the characteristics of the human eye.

If the recording medium can handle gradation levels of 3 bits/picture-element while the input picture signal has gradation levels of 6 bits/picture-element, this is equivalent to making a recording by quantizing 6 bits/picture-element of an input picture-signal into 3 bits/picture-element. This coarse quantization, of course, causes a large quantization distortion. The quantization distortion appears as a false contour, and is most significant in portions of the picture which change abruptly.

SUMMARY OF THE INVENTION

Accordingly, an object of the invention is to eliminate the above-described difficulties. More specifically, an object of the invention is to provide a shaded picture signal processing system in which, with the resolution of a picture being maintained nearly unchanged, noticeable quantization distortion is eliminated by a simple technique thereby to produce halftone pictures with a high quality.

The invention provides a processing system and method by which halftones of high quality are reproduced on a recording or displaying medium having few gradation levels by a simple technique with the resolution maintained nearly unchanged. This method and system are effective for a recording medium which can record only binary data.

The system of the invention has been developed taking into account the fact that, if, with respect to false contours appearing as quantization distortion, noise of equal magnitude to false contours is dispersed throughout the whole picture, the false contours cannot be seen. More specifically, a specific feature of the shaded picture signal processing system according to the invention resides in that, in obtaining an output picture signal by quantizing an input picture signal having gradations of p bits per picture element into gradations of q bits per picture element, the input picture signal is formed in blocks of m×n picture elements, a plurality of typical values are selected for a picture element $x_{ij}$ at a spatial address (i, j) in the block, quantized values are obtained by quantizing the typical values in q bits, quantization higher values are obtained by adding the quantized values to quantization step data and quantization errors which are the differences between the typical values and the quantized values are calculated, a threshold pattern in m×n matrix form is provided for the block, the quantized value or the quantization higher value corresponding to the spatial address (i, j) is selected by comparison of a threshold $c_{ij}$ at a spatial address (i, j) in the threshold pattern with the corresponding quantization error so as to produce an output picture signal $y_{ij}$ representing each picture element by q bits, corresponding to the spatial address, thereby to reproduce halftones.

BRIEF DESCRIPTION OF THE DRAWINGS

FIGS. 3A–3C show data for a description of the second embodiment of the system according to the invention in which, FIG. 3A shows input picture elements $x_{ij}$ in one block of a 4×4 arrangement, FIG. 3B average values $\bar{x}_1$ and $\bar{x}_0$, FIG. 3C regions A and B in a flag memory 11, FIG. 3D a threshold pattern, FIG. 3E quantized values, FIG. 3F quantization errors, and FIG. 3G output picture signals;

FIG. 4 is a block diagram showing a circuit for varying the threshold pattern suitably according to input picture elements;

FIGS. 5A and 5B are explanatory diagrams for a description of the effects of the invention in which FIG. 5A shows a threshold pattern and FIG. 5B the relation between input and output picture signals.

DESCRIPTION OF THE PREFERRED EMBODIMENTS

The invention will be described with reference to the accompanying drawings in detail.

Figure 2A:
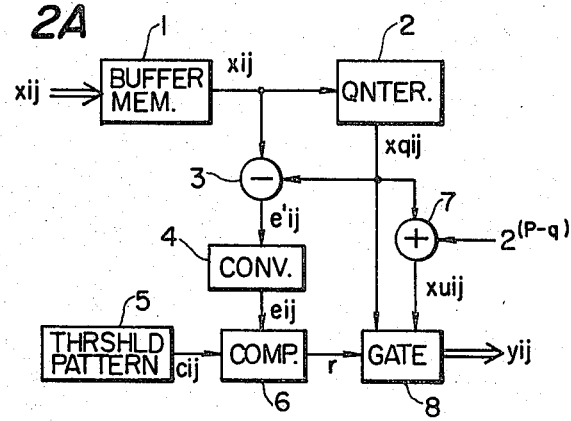
FIGS. 2A and 2B are block diagrams showing first and second embodiments of a shaded picture signal processing system according to the invention.

FIG. 2A is a block diagram of a shaded picture signal processing system according to the invention. In this embodiment, an input picture signal $x_{ij}$ having gradation levels of p bits/picture-element is outputted as an output picture signal $y_{ij}$ having gradation levels of q bits/picture-element.

In FIG. 2A, reference numeral 1 designates a block input circuit which includes a buffer memory capable of storing m×n picture elements. The block input circuit 1 reads input picture signals of p bits per picture-element successively to form blocks each having m×n picture elements.

Each picture element $x_{ij}$ (i=i through m, and j=1 through n) of the input picture signal stored in the buffer memory in the block input circuit is quantized in q bits into a quantized value $x_{qij}$ by a quantizer 2. With the quantizer 2, the quantized value $x_{qij}$ can be readily obtained by setting, for instance, the lower (p−q) bits of the p bits of the picture element $x_{ij}$ to 0.

The quantized value $x_{qij}$ is subtracted from the picture element $x_{ij}$ ($x_{ij}-x_{qij}$) by a subtractor 3 and the subtraction result is applied, as a quantization error $e'_{ij}$, to a converter 4. The quantization error is a value which is included in the lower (p−q) bits of the p bits of the picture element $x_{ij}$. Accordingly, the quantization error $e'_{ij}$ is a value representative of a gradation level which is not outputted as a picture signal and therefore no quantization distortion in the output picture occurs because of this. According to the invention, as is described below in more detail, the output picture signal $y_{ij}$ having gradation levels of q bits is suitably corrected in proportion to a value expressed by the quantization error $e'_{ij}$ so that false contours appearing as quantization distortion are effectively eliminated taking into account the resolution of the human eye. This is one of the significant features of the invention.

Referring back to FIG. 2A, in the converter 4, the quantization error $e'_{ij}$ is subjected to a conversion process so that it is within the value of a threshold $c_{ij}$ in a threshold pattern (described later). For instance if p=8, q=3 and m×n=4×4, the threshold $c_{ij}$ has 16 different values, 0 through 15. Therefore, 32 different quantization errors $e'_{ij}$ expressed in five (p−q=5) bits are converted into sixteen different values. A circuit for this purpose is very simple, and can be realized by a shift register. The general calculation operation of the converter 4 is:

$$e = e' \times m \times n / 2(p-q)$$

where e is the output and e′ is the input. Especially in the case where the value m×n can be expressed by $2^\alpha$, the converter 4 may be constituted by a shift register. In this case, the conversion can be achieved by shifting the content of the shift register by a number of positions ($\alpha-p+q$) towards the left when positive or the right when negative. In correspondence to one block when the input picture signal is read, the quantization error $e_{ij}$ provided by the converter 4 is compared with each threshold value $c_{ij}$ in a threshold pattern 5 in m×n matrix form in correspondence to a spatial address (i, j) by a comparator 6. The quantized value $x_{qij}$ is added to quantization step data, which is $2^{(p-q)}$ in this case, with an adder 7 to provide a higher quantization value $x_{uij}$.

In correspondence to the spatial address (i, j), the threshold value $c_{ij}$ is compared with the quantization error $e_{ij}$ with the comparator 6 for i=1 through m and j=1 through n. As a result, for the spatial address (i, j) a signal r, which is 0 when $e_{ij} \leq c_{ij}$ and 1 when $e_{ij} > c_{ij}$, is applied to a gate 8.

The gate 8 is controlled so that, in correspondence to the spatial address (i, j) the quantized value $x_{qij}$ is outputted when the signal r is 0 and the quantization higher value $x_{uij}$ is outputted when the signal r is 1. Thus, one of the quantized value $x_{qij}$ and higher quantization value $x_{uij}$ is outputted as an output picture signal $y_{ij}$ having gradation levels of q bits. Accordingly, the quantization error $e_{ij}$ is dispersed, depending on its magnitude, over the output picture signal $y_{ij}$ in one block, thereby to effectively eliminate quantization distortion in the block.

Figure 6A:
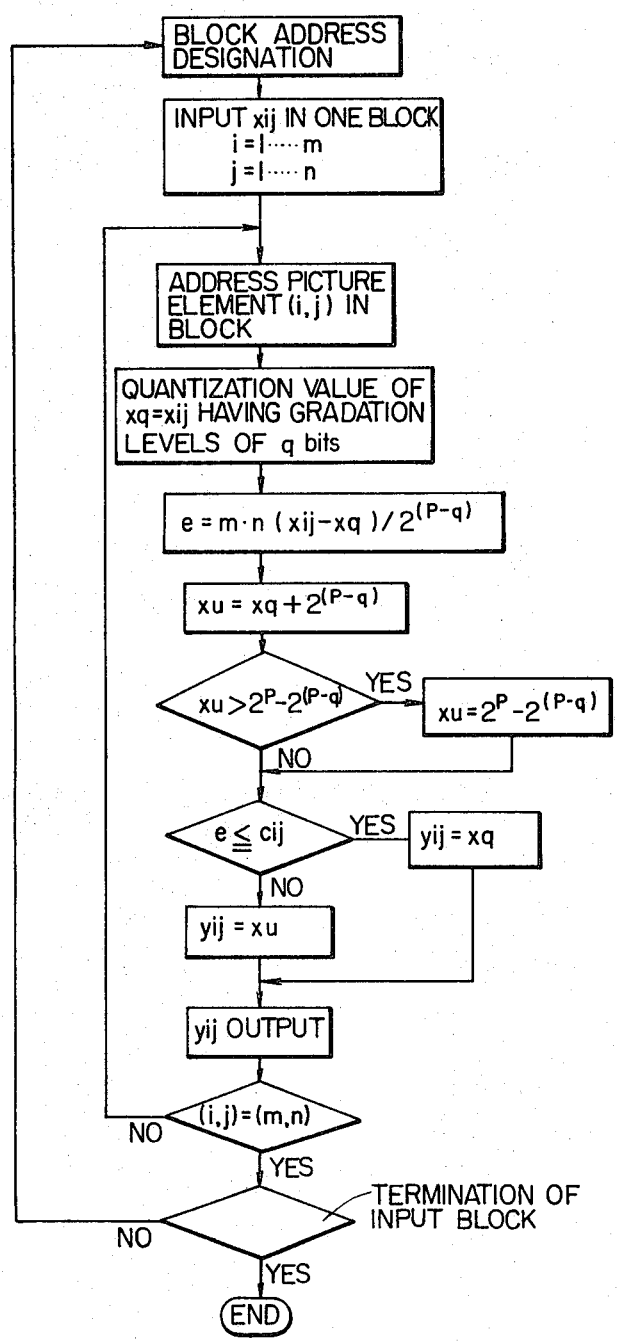
FIGS. 6A and 6B are flow charts for a description of the operation of the invention.

The quantization error $e_{ij}$ is uniformly dispersed in the range of from (quantized value $x_{qij}$) to (quantized value $x_{qij}$+quantization step data). Therefore, in the case where (quantized value $x_{qij}$+quantization step data), i.e., the higher quantization value $x_{uij}$ is a value larger than ($2^p - 2^{(p-q)}$), such a value does not exist as a value when a picture element of p bits is quantized in q bits. Therefore, in this case, the value ($2^p - 2^{(p-q)}$) is employed as the higher quantization value $x_{uij}$. This process indicates that sometimes the quantized value $x_{qij}$ becomes equal to the quantization higher value $x_{uij}$. Only in this case is the quantization error $e_{ij}$ not dispersed in the relevant block. The process of the embodiment of the invention shown in FIG. 2A will become more apparent from the flow chart shown in FIG. 6A.

Figure 2B:
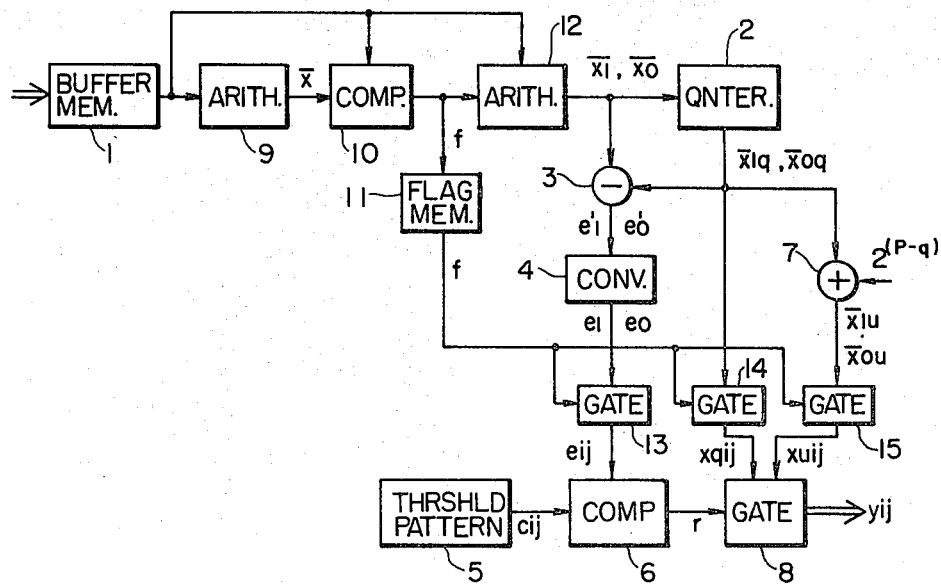

Another example of a shaded picture signal processing system according to the invention is shown in FIG. 2B. The operation of the embodiment of FIG. 2B is substantially the same as that of the above described embodiment of FIG. 2A. However, in the case of FIG. 2B, the operation is as follows. In an arithmetic circuit 9 an average value $$\bar{x} = \sum_i \sum_j x_{ij}/mn$$

is obtained from the picture elements $x_{ij}$ in the same block input circuit as in FIG. 2A. Then, the picture elements $x_{ij}$ in one block are compared with the average value $\bar{x}$ with a comparator 10. A signal f is outputted which is set to 1 when $\bar{x} \geq x_{ij}$ and to 0 when $\bar{x} < x_{ij}$. The signal f is stored in a flag memory 11 which is provided for the spatial address (i, j) of the one block.

With the aid of the flag memory 11, a block is divided into a region A with signal f=1 and a region B with signal f=0 according to the picture elements $x_{ij}$. At the same time, in response to the signals f from the comparator 10, average values $\bar{x}_1$ and $\bar{x}_0$ are calculated from the picture elements $x_{ij}$ in the block with an arithematic circuit 12. That is, in correspondence to the spatial address (i, j), the average value $\bar{x}_1$ of the picture elements $x_{ij}$ which belong to the region A with signal f=1 and the average value $\bar{x}_0$ of the picture elements $x_{ij}$ which belong to the region B with signal f=0 are provided.

The average values $\bar{x}_1$ and $\bar{x}_0$ are quantized in q bits by a quantizer 2, which is constructed the same as that of FIG. 2A, into quantized values $\bar{x}_{1q}$ and $\bar{x}_{0q}$. The average values $\bar{x}_1$ and $\bar{x}_0$ and the quantized values $\bar{x}_{1q}$ and $\bar{x}_{0q}$ are subjected to subtraction with a subtractor 3 to provide quantization errors $e'_1$ and $e'_0$, respectively. The quantization errors $e'_1$ and $e'_0$ are converted into quantization errors $e_1$ and $e_0$ by a converter 4. On the other hand, the quantized values $\bar{x}_{1q}$ and $\bar{x}_{0q}$ are added to quantization step data (which is $2^{(p-q)}$ in the example) with an adder 7 to provide higher quantization values $\bar{x}_{1u}$ and $\bar{x}_{0u}$.

The quantization errors $e_1$ and $e_0$, quantized values $\bar{x}_{1q}$ and $\bar{x}_{0q}$ or higher quantization values $\bar{x}_{1u}$ and $\bar{x}_{0u}$ thus obtained are selectively gated by the gates 13, 14 and 15 which are selectively opened by the output signal f of the flag memory 11 which is provided in correspondence to the spatial address (i, j) of the one block. More specifically, when the signal f=1 in correspondence with the spatial address (i, j), the quantization error $e_1$, quantized value $\bar{x}_{1q}$ and quantization higher value $\bar{x}_{1u}$ are selected, while when the signal f=0, the quantization error $e_0$, quantized value $\bar{x}_{0q}$ and quantization higher value $\bar{x}_{0u}$ are selected and are outputted as a quantization error $e_{ij}$, a quantized value $x_{qij}$ and a quantization higher value $x_{uji}$ by the gates 13, 14 and 15, respectively. The operation following this is completely the same as that in the case of FIG. 2A.

Figure 6B:
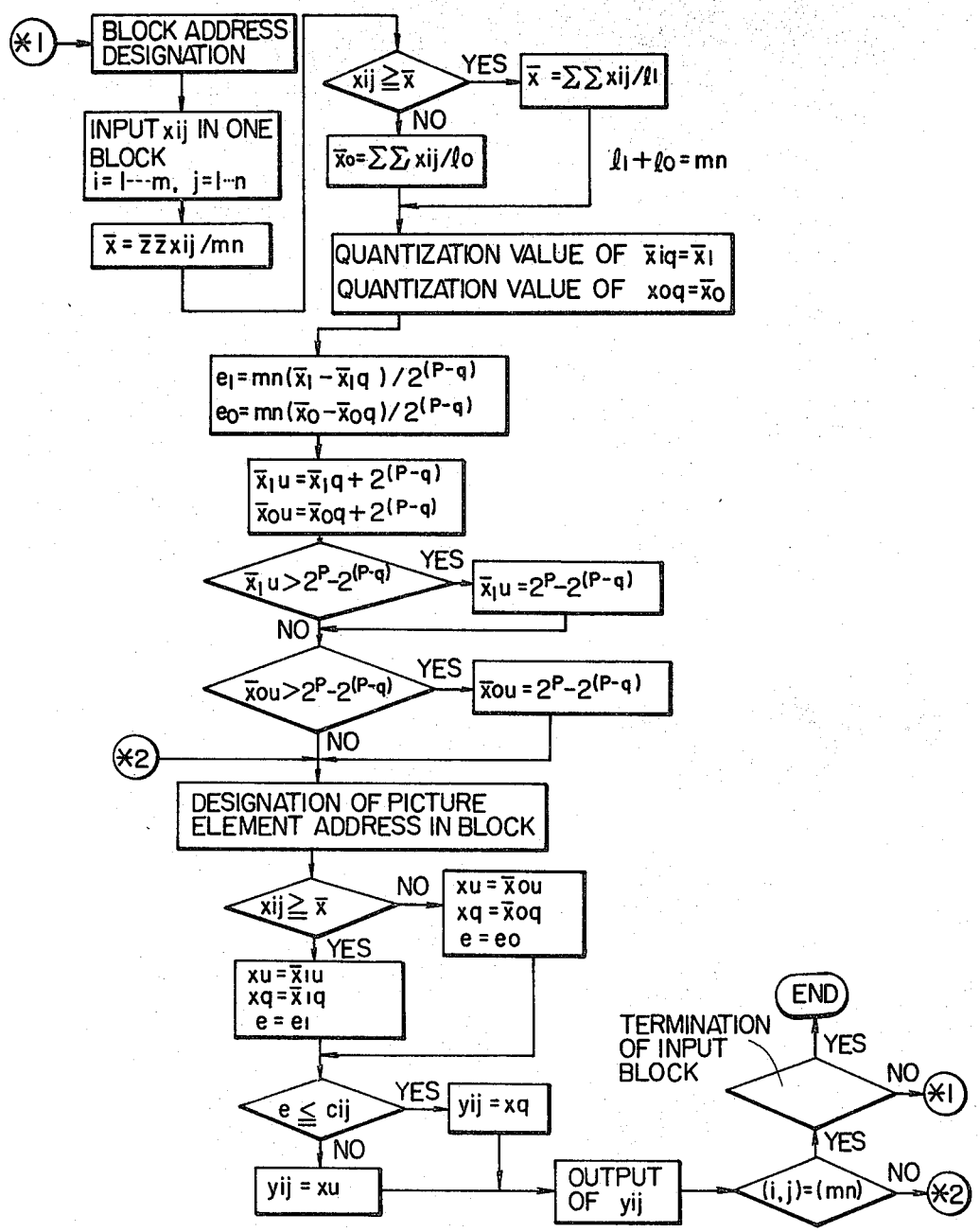

The operation of the above-described second embodiment will become more apparent from the flow chart shown in FIG. 6B. The contents of the flag memory, the average values $\bar{x}_1$ and $\bar{x}_0$, the threshold value $c_{ij}$, the quantized values $\bar{x}_{1q}$ and $\bar{x}_{0q}$, the quantization errors $e_1$ and $e_0$ and the output picture signal $y_{ij}$ in correspondence with the picture element $x_{ij}$ in one block are indicated with actual values in FIGS. 3A–3G. That is, in FIG. 3A, the picture elements $x_{ij}$ are shown in one block, in FIG. 3B the averae values $\bar{x}_1$ (=66) and $\bar{x}_0$(=30), in FIG. 3C the flag memory 11 with the regions A and B being indicated by 1 and 0, respectively, FIG. 3D the threshold pattern, FIG. 3E the quantized values, FIG. 3F the quantization errors, and FIG. 3G the output picture signals as is the case where one block is of the 4×4 arrangement and p=7 and q=3.

In the above-described embodiments of the invention, the threshold pattern is fixed irrespective of the picture element $x_{ij}$. However, if the threshold pattern is made variable for blocks, although the process is relatively intricate, the resolution of a picture is improved as a whole. This can be achieved by varying the arrangement of the thresholds $c_{ij}$ in the threshold pattern for every block according to the distribution in magnitude of the picture elements $x_{ij}$ in each block.

Figures 3A, 3B, 3C, 3D, 3E, 3F, 3G, 4:
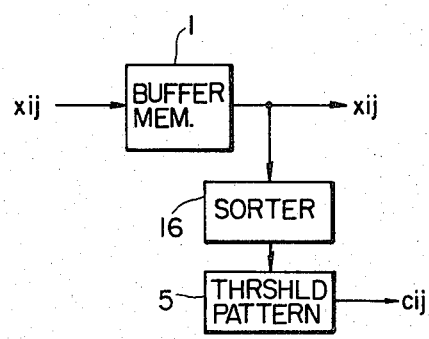

An example of this method will be described with reference to FIG. 4. The method can be practiced by inserting a sorter 16 between the block input circuit 1 and the threshold pattern 5 which is described with reference to FIGS. 2A and 2B. The picture elements $x_{ij}$ from the block input circuit 1 are loaded successively into the sorter 16 where they are rearranged one-dimensionally in descending order (as 6, 5, 4, 3, . . . ). The rearrangement is carried out while addresses indicating the original positions of the picture elements $x_{ij}$ are assigned to the picture elements $x_{ij}$ so that the correspondence of the picture elements $x_{ij}$ to the original spatial address (i, j) is maintained unchanged. The picture elements $x_{ij}$ arranged in descending order are numbered. The numbers of the picture elements $x_{ij}$ increase as the values of the picture elements $x_{ij}$ decrease. The number is given as the threshold $c_{ij}$ in the threshold pattern which corresponds to the original spatial address (i, j) of the picture element. That is, the sorter 16 operates so that the smallest threshold $c_{ij}$ is assigned to the largest of the values of the picture elements $x_{ij}$ in one block while the largest threshold $c_{ij}$ is assigned to the smallest of the values of the picture elements $x_{ij}$, i.e. the threshold $c_{ij}$ increases as the value of the picture element $x_{ij}$ decreases. In this method, the output picture is somewhat lower in gradation but has a clear contour.

As is apparent from the above description, quantization distortion which is caused in expressing output picture signals with fewer gradation levels with respect to the gradation levels of input picture signals is dispersed, depending on its magnitude, in one block to positively eliminate false contours from the output picture. This is a utilization of the integration effect of the human eye as in the dot density modulation or the dither method which are employed in printing. However, according to a specific feature of the invention, the quantization error which is caused when the input picture signal is quantized so as to match the gradation characteristic of the recording medium is dispersed in one block according to the quantization error itself and the size of the block so that no gradations are apparent to the eye and halftones of high quality are reproduced.

Thus, the invention provides novel features in that the halftones of the output picture are reproduced with the quantization error being dispersed in the periphery of the picture elements in addition to the fact that the recording or displaying medium of the output picture is capable of expressing gradation to some extent.

Figure 1:
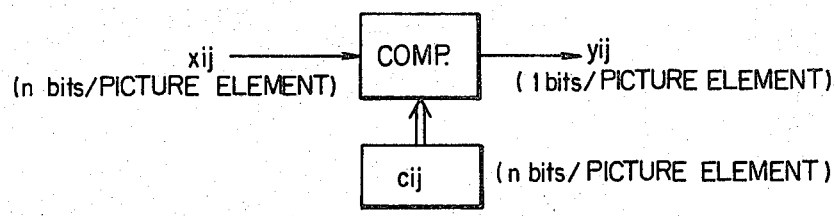
FIG. 1 is a block diagram for a description of the principle of a conventional dither method.

If, in accordance with the invention, an input picture element of (p+1) bits/picture-element is quantized into an output picture signal of 1 bit/picture-element, then the remaining p bits/picture-element is the quantization error. If it is assumed that the most significant bit of the input picture signal is 0 at all times, then only in this case the technical concept of the invention is the same as that of the dither method in which, as shown in FIG. 1, an output picture signal of 1 bit/picture-element is obtained from an input picture signal of p bits/picture-element.

A method of reproducing halftones according to the invention will be described with reference to the diagram shown in FIG. 5.

Figures 5A, 5B:
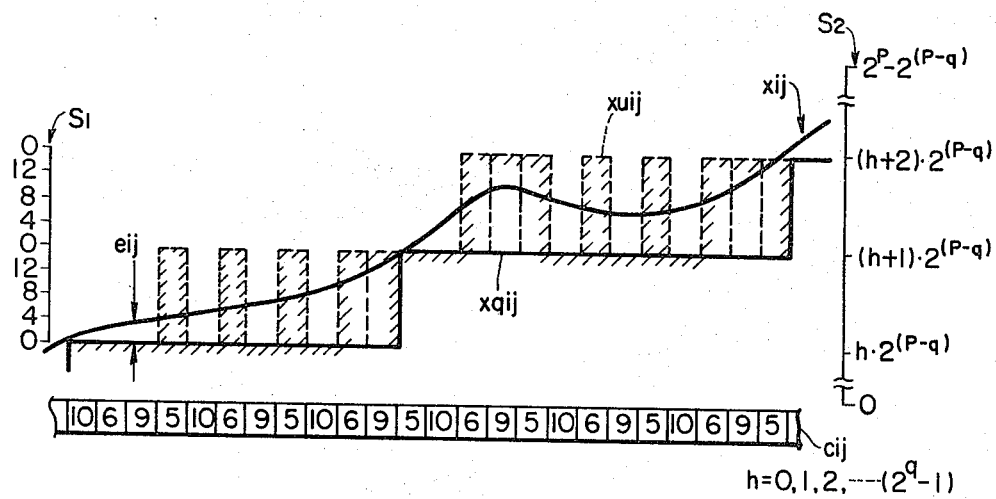

FIG. 5A shows a specific example of a threshold pattern. The numbers of FIG. 5A represent a threshold value $c_{ij}$ corresponding to the same spatial address as that of a picture element $x_{ij}$. FIG. 5B shows a general example of input and outout picture signals using the threshold pattern shown in FIG. 5B.

The picture element of the spatial address (i, j), i.e. the j-th picture element in the i-th line, is typically expressed as a quantized value $x_{qij}$ which is obtained by quantizing the input picture signal $x_{ij}$ in q bits/picture-element, where j is 1, 2, 3 and 4, respectively, for the whole picture.

In FIG. 5B, reference character $c_{ij}$ designates the i-th line in the threshold pattern, which is repeatedly arranged, and reference character $S_1$ designates a scale for quantization error for quantized values $h \cdot 2^{(p-2)}$ and $(h+1) \cdot 2^{(p-q)}$ which are provided by quantization in q bits. In this case, the block size $m \times n = 16$. Therefore, the scale is made by dividing the quantization step data $2^{(p-q)}$ into 16 equal parts. Further in FIG. 5B, reference character $S_2$ designates a scale for quantized values. More specifically, if $p=6$ and $q=3$, then $S_2$ represents the values 0, 8, 16, 24, 32, 40, 48 and 56. Under this condition, the threshold $c_{ij}$ is compared with the corresponding quantization error $e_{ij}$ ($e'_{ij} = (x_{ij} - x_{qij})$, $e_{ij} = 16 e'_{ij}/2^{(p-q)}$). When $e_{ij} \leq c_{ij}$, $x_{qij}$ is selected. When $e_{ij} > c_{ij}$, $x_{uji} = x_{qij} + 2^{(p-q)}$ is selected. As a result, portions shaded with oblique lines as shown in FIG. 5B are obtained as output picture signals $y_{ij}$.

Upon averaging the shaded portions by the eye, the false contour appearing as quantization distortion is remarkably corrected and the halftones are reproduced through the quantization steps.

As is clear from the above description, the system of the invention is simple in operation and can be realized with a low manufacturing cost. The employment of the system can remarkably correct false contours in the output picture due to quantization and reproduce halftones with a high quality.

What is claimed is:

1. A shaded picture signal processing method for obtaining an output picture signal by quantizing an input picture signal having gradations of p bits per picture element into gradation levels of q bits per picture element with said input picture signal formed in a block of $m \times n$ picture elements, comprising the steps of: calculating a quantized value $x_{qij}$ by quantizing in q bits per picture element $x_{ij}$ in a spatial address (i, j) in said block; calculating a higher quantization value $x_{uij}$ by adding predetermined quantization step data to said quantized value $x_{qij}$; calculating a quantization error $e_{ij}$ which is a difference between said picture element $x_{ij}$ and said quantized value $x_{qij}$; and providing a threshold pattern in $m \times n$ matrix form in correspondence to said one block; selecting one of said quantized value $x_{qij}$ and higher quantization value $x_{uij}$ in response to a comparison of said quantization error $e_{ij}$ with a threshold $c_{ij}$ at a spatial address (i, j) in said threshold pattern to output an output picture signal $y_{ij}$ of q bits per picture element corresponding to said spatial address thereby to reproduce halftones.

2. A shaded picture signal processing method in which an input picture signal is formed in a block $m \times n$ picture elements, comprising the steps of: calculating an average value $\bar{x}$ from picture elements $x_{ij}$ of said block; dividing said block into a region A in which picture elements $x_{ij} \geq$ average value $\bar{x}$ and a region B in which picture elements $x_{ij} <$ average value $\bar{x}$; calculating average values $\bar{x}_1$ and $\bar{x}_0$ of said picture elements $x_{ij}$ in said regions A and B; calculating quantized values $\bar{x}_{1q}$ and $\bar{x}_{0q}$ by quantizing in q bits said average values $\bar{x}_1$ and $\bar{x}_0$; calculating higher quantization values $\bar{x}_{1u}$ and $\bar{x}_{0u}$ obtained by adding said quantized values $\bar{x}_{1q}$ and $\bar{x}_{0q}$ to predetermined quantization step data; calculating quantization errors $e_1$ and $e_0$ which are differences between said average value $\bar{x}_1$ and said quantized value $\bar{x}_{1q}$ and between said average value $\bar{x}_0$ and said quantized value $\bar{x}_{0q}$; providing a threshold pattern in $m \times n$ matrix form in correspondence to said block; and obtaining an output picture signal $y_{ij}$ in which each picture element comprises q bits corresponding to a spatial address (i, j) in said threshold pattern by selecting one of said quantized value and higher quantization value by comparing said quantization error with a threshold $c_{ij}$ in said spatial address, wherein, when said spatial address (i, j) is in said region A said quantization error $e_1$, quantized value $\bar{x}_{1q}$ and higher quantization value $\bar{x}_{1u}$ are employed and when said spatial address is in said region B, said quantization error $e_0$, quantized value $\bar{x}_{0q}$ and quantization higher value $\bar{x}_{0u}$ are employed; and outputting one of said quantized value $\bar{x}_{1q}$ and quantization higher value $\bar{x}_{1u}$, and said quantized value $\bar{x}_{0q}$ and quantization higher value $\bar{x}_{0u}$ to reproduce halftones.

3. The system as claimed in claim 1 or 2 wherein said quantization step data is set to $2^{(p-q)}$.

4. The system as claimed in claim 1 or 2 wherein said threshold $c_{ij}$ in said threshold pattern is fixed independent of input picture signals.

5. The system as claimed in claim 1 or 2 wherein said threshold pattern is varied according to the magnitudes of said picture elements $x_{ij}$ in said block so as to be suitably variable for blocks.

* * * * *